United States Patent
Satoyoshi

(10) Patent No.: US 9,031,753 B1
(45) Date of Patent: May 12, 2015

(54) CONTROL APPARATUS FOR AUTOMATIC TRANSMISSION AND CONTROL METHOD FOR AUTOMATIC TRANSMISSION

(71) Applicant: Honda Motor Co., Ltd., Tokyo (JP)

(72) Inventor: Takashi Satoyoshi, Wako, TX (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/499,243

(22) Filed: Sep. 29, 2014

(30) Foreign Application Priority Data

Oct. 23, 2013 (JP) .................................. 2013-220128

(51) Int. Cl.
| | | |
|---|---|---|
| *G06F 7/00* | (2006.01) | |
| *F16H 61/02* | (2006.01) | |
| *F16H 61/68* | (2006.01) | |

(52) U.S. Cl.
CPC ............ *F16H 61/0213* (2013.01); *F16H 61/68* (2013.01)

(58) Field of Classification Search
CPC ................ B60W 10/02; B60W 10/11; B60W 2050/0014; B60W 2050/0062; B60W 2510/0208; B60W 2510/0291; F16H 2061/009; F16H 2061/0459
See application file for complete search history.

(56) References Cited

U.S. PATENT DOCUMENTS

| | | | | |
|---|---|---|---|---|
| 8,073,604 | B2 * | 12/2011 | Hwang et al. .................... | 701/67 |
| 2008/0215220 | A1 * | 9/2008 | Winkel et al. ................... | 701/68 |
| 2010/0312444 | A1 * | 12/2010 | Takamatsu et al. ............. | 701/68 |
| 2011/0029207 | A1 * | 2/2011 | Sasahara et al. ................ | 701/56 |

FOREIGN PATENT DOCUMENTS

| | | | |
|---|---|---|---|
| JP | 4913535 B2 | 5/2008 | |
| JP | 4913848 B2 | 2/2011 | |

\* cited by examiner

*Primary Examiner* — David D Le
(74) *Attorney, Agent, or Firm* — Mori & Ward, LLP

(57) ABSTRACT

A control apparatus for an automatic transmission that selectively engages a plurality of frictional engaging elements for shift control includes a shift instruction device, a temperature calculator, an engageability determiner, an engagement delay device, a load calculator, a cumulative load calculator, and a threshold temperature changer. The engageability determiner is configured to determine whether at least one of the plurality of frictional engaging elements is engageable or not based on a comparison between a temperature of the at least one of the plurality of frictional engaging elements calculated by the temperature calculator and a predetermined threshold temperature in a case where the shift instruction device outputs a shift instruction. The threshold temperature changer is configured to change the predetermined threshold temperature in a case where a cumulative load calculated by the cumulative load calculator reaches a value greater than or equal to a predetermined value.

8 Claims, 8 Drawing Sheets

FIG. 4

| SHIFT INSTRUCTION PATTERN / CLUTCH PLATE TEMPERATURE Tp | UPSHIFT | DOWNSHIFT | |
|---|---|---|---|
| | | ONE-STAGE SHIFT | MULTI-STAGE DIRECT SHIFT |
| FIRST RANGE (Tp < Tth) | ○ | ○ | △#1 |
| SECOND RANGE (Tp ≥ Tth) | × | △ | × |

○ : ENGAGEABLE
× : NON-ENGAGEABLE
△ : ENGAGEABILITY IS DETERMINED IN CONSIDERATION OF ROTATIONAL DIFFERENCE

CONTROL APPARATUS FOR AUTOMATIC TRANSMISSION AND CONTROL METHOD FOR AUTOMATIC TRANSMISSION

CROSS-REFERENCE TO RELATED APPLICATIONS

The present application claims priority under 35 U.S.C. §119 to Japanese Patent Application No. 2013-220128, filed Oct. 23, 2013, entitled "Control Apparatus for Automatic Transmission." The contents of this application are incorporated herein by reference in their entirety.

BACKGROUND

1. Field

The present disclosure relates to a control apparatus for an automatic transmission and a control method for an automatic transmission.

2. Description of the Related Art

Automatic transmissions that automatically perform shifting by switching power transmission paths each composed of a plurality of shift gear trains through selective engagement of frictional engaging elements, such as shift clutches, have been widely employed for vehicles. In recent automatic transmissions, in order to increase the power of engines and the shifting performance of the automatic transmissions, for example, shift operation (engagement of frictional engaging elements) of the automatic transmissions tends to be frequently performed. Accordingly, the automatic transmissions tend to suffer from an increased calorific value in engaging the frictional engaging elements during shifting. The increased calorific value of the frictional engaging elements might cause seizing (burning) of the frictional engaging elements and other problems. Thus, there is a need for protection control for protecting the frictional engaging elements against thermal damage.

Regarding such protection control, Japanese Patents Nos. 4913535 and 4913848 describe control devices for automatic transmissions. In the control device described in Japanese Patent No. 4913535, the temperature of at least one of frictional engaging elements to be engaged in shifting is computed. In a case where the computed temperature is higher than a reference temperature, if a shift operation to a target gear position is an upshift operation using the frictional engaging element to be engaged, the time of the upshift operation is delayed by a predetermined time. On the other hand, if the shift operation to the target gear position is a downshift operation, the downshift operation is allowed without a delay.

In the control device described in Japanese Patent No. 4913848, the temperature of a frictional engaging element is calculated, and the rotational difference between an input and an output of the frictional engaging element is calculated. Based on the calculated temperature and rotational difference of the frictional engaging element and a pattern of a speed change instruction, it is determined whether the frictional engagement element is engageable or non-engageable. If there is a possibility of burning of the frictional engaging element, the frictional engagement element is determined to be non-engageable, and engagement thereof is delayed until the frictional engagement element is determined to be engageable. In this manner, an appropriate cooling period is selected, and thus, engagement can be controlled with protection of the frictional engaging element against thermal damage.

SUMMARY

According to one aspect of the present invention, a control apparatus for an automatic transmission that selectively engages a plurality of frictional engaging elements for shift control includes a shift instruction section, a temperature calculator, an engageability determiner, an engagement delay section, a load calculator, and a cumulative load calculator. The shift instruction section issues a shift instruction. The temperature calculator calculates a temperature of at least one of the frictional engaging elements. The engageability determiner determines whether the at least one of the frictional engaging elements is engageable or not on the basis of a comparison between the temperature of the at least one of the frictional engaging elements calculated by the temperature calculator and a predetermined threshold temperature when the shift instruction section issues the shift instruction. The engagement delay section, if the engageability determiner determines that the one of the frictional engaging elements is non-engageable, delays engagement of the at least one of the frictional engaging elements until the at least one of the frictional engaging elements is determined to be engageable. The load calculator calculates a load input to each of the frictional engaging elements when the automatic transmission performs shift operation. The cumulative load calculator calculates a cumulative load of accumulated loads calculated by the load calculator. The engageability determiner changes a threshold temperature for determining whether the at least one of the frictional engaging elements is engageable or not when the cumulative load calculated by the cumulative load calculator reaches a value greater than or equal to a predetermined value.

According to another aspect of the present invention, a control apparatus for an automatic transmission that selectively engages a plurality of frictional engaging elements for shift control includes a shift instruction device, a temperature calculator, an engageability determiner, an engagement delay device, a load calculator, a cumulative load calculator, and a threshold temperature changer. The shift instruction device is configured to output a shift instruction. The temperature calculator is configured to calculate a temperature of at least one of the plurality of frictional engaging elements. The engageability determiner is configured to determine whether the at least one of the plurality of frictional engaging elements is engageable or not based on a comparison between the temperature of the at least one of the plurality of frictional engaging elements calculated by the temperature calculator and a predetermined threshold temperature in a case where the shift instruction device outputs the shift instruction. The engagement delay device is configured to delay engagement of the at least one of the plurality of frictional engaging elements until the at least one of the plurality of frictional engaging elements is determined to be engageable in a case where the engageability determiner determines that the at least one of the plurality of frictional engaging elements is non-engageable. The load calculator is configured to calculate a load input to each of the plurality of frictional engaging elements in a case where the automatic transmission performs shift operation. The cumulative load calculator is configured to calculate a cumulative load of the load calculated by the load calculator. The threshold temperature changer is configured to change the predetermined threshold temperature in a case where the cumulative load calculated by the cumulative load calculator reaches a value greater than or equal to a predetermined value.

According to further aspect of the present invention, in a control method for an automatic transmission that selectively engages a plurality of frictional engaging elements for shift control, A shift instruction is output. A temperature of at least one of the plurality of frictional engaging elements is calculated. Whether the at least one of the plurality of frictional engaging elements is engageable or not is determined based on a comparison between the temperature of the at least one of the plurality of frictional engaging elements calculated by the calculating of the temperature and a predetermined threshold temperature in a case where the shift instruction is output. Engagement of the at least one of the plurality of frictional engaging elements is delayed until the at least one of the plurality of frictional engaging elements is determined to be engageable in a case where the at least one of the plurality of frictional engaging elements is determined to be non-engageable. A load input to each of the plurality of frictional engaging elements is calculated in a case where the automatic transmission performs shift operation. A cumulative load of the load calculated by the calculating of the load is calculated. The predetermined threshold temperature is changed in a case where the cumulative load calculated by the calculating of the cumulative load reaches a value greater than or equal to a predetermined value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 4 is a table showing a shift restriction rule for defining a criterion for determining clutch engageability depending on a combination of a pattern of a shift instruction and a rotational difference in each temperature range.

DESCRIPTION OF THE EMBODIMENTS

Figure 1:
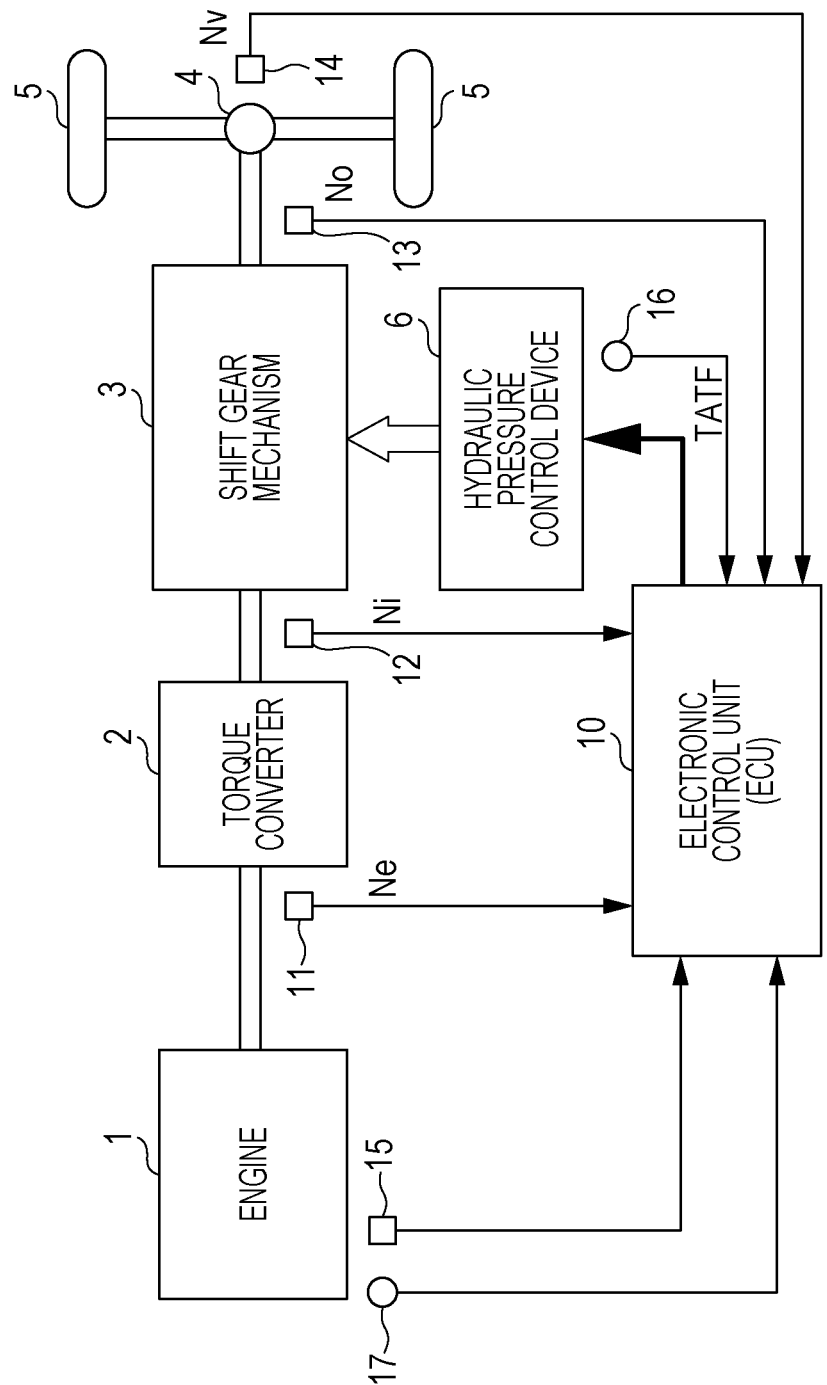
FIG. 1 is a block diagram schematically illustrating a power transmission system and a control system of a vehicle including a control device for an automatic transmission according to an embodiment of the present application.

The embodiments will now be described with reference to the accompanying drawings, wherein like reference numerals designate corresponding or identical elements throughout the various drawings.

An embodiment of the present application will be described in detail with reference to the drawings. FIG. 1 is a block diagram schematically illustrating a power transmission system and a control system of a vehicle including a control device for an automatic transmission according to an embodiment of the present application. The power transmission system of the vehicle includes: an engine 1 serving as a power source; a torque converter 2 serving as a fluid coupling for transmitting a rotation output of the engine 1 to a shift gear mechanism 3; the shift gear mechanism 3 that receives the rotation output from the torque converter 2, changes the speed of the rotation output with a predetermined speed ratio, and outputs the resulting rotation output; and a differential gear mechanism 4 that distributes the output rotation from the shift gear mechanism 3 to left and right wheels (e.g., rear wheels) 5. A hydraulic pressure control device 6 is attached to the torque converter 2 and the shift gear mechanism 3. The hydraulic pressure control device 6 locks up the torque converter 2 and sets the input/output speed ratio in the shift gear mechanism 3 at a required gear position by engaging or releasing a predetermined combination of frictional engaging elements of a hydraulic pressure control type (e.g., clutches) provided in the torque converter 2 and the shift gear mechanism 3. The automatic transmission of the vehicle is composed of the torque converter 2, the shift gear mechanism 3, and the hydraulic pressure control device 6, for example.

A control system for controlling the power transmission system of the vehicle includes sensors located at various positions of the vehicle, an electronic control unit (ECU) 10 that receives outputs from the sensors, and the hydraulic pressure control device 6 controlled by the electronic control unit 10, for example. A rotation sensor 11 detects the number of revolutions per a unit time (engine speed) Ne of the input shaft of the torque converter 2. A rotation sensor 12 detects the number of revolutions Ni per a unit time of the input shaft of the shift gear mechanism 3. A rotation sensor 13 detects the number of revolutions No of the output shaft of the shift gear mechanism 3. A vehicle speed sensor 14 detects a vehicle speed Nv. A throttle sensor 15 detects the opening degree of the throttle of the engine 1 that is determined depending on the degree of depression of an accelerator pedal. An ATF temperature sensor 16 detects a temperature (ATF temperature) of hydraulic fluid in the hydraulic pressure control device 6. A coolant temperature sensor 17 detects the temperature of an engine coolant.

The power transmission system and control system of the vehicle illustrated in FIG. 1 may employ known configurations. The control device for the automatic transmission of the present application is included in the electronic control unit 10, and is implemented as one of various control functions that can be performed by the electronic control unit 10. In the following example, the control device for the automatic transmission of the present application is operated by a computer program included in the electronic control unit 10. The control device for the present application is not operated only by a computer program, and may be, of course, operated by dedicated electronic circuit hardware.

Figure 2:
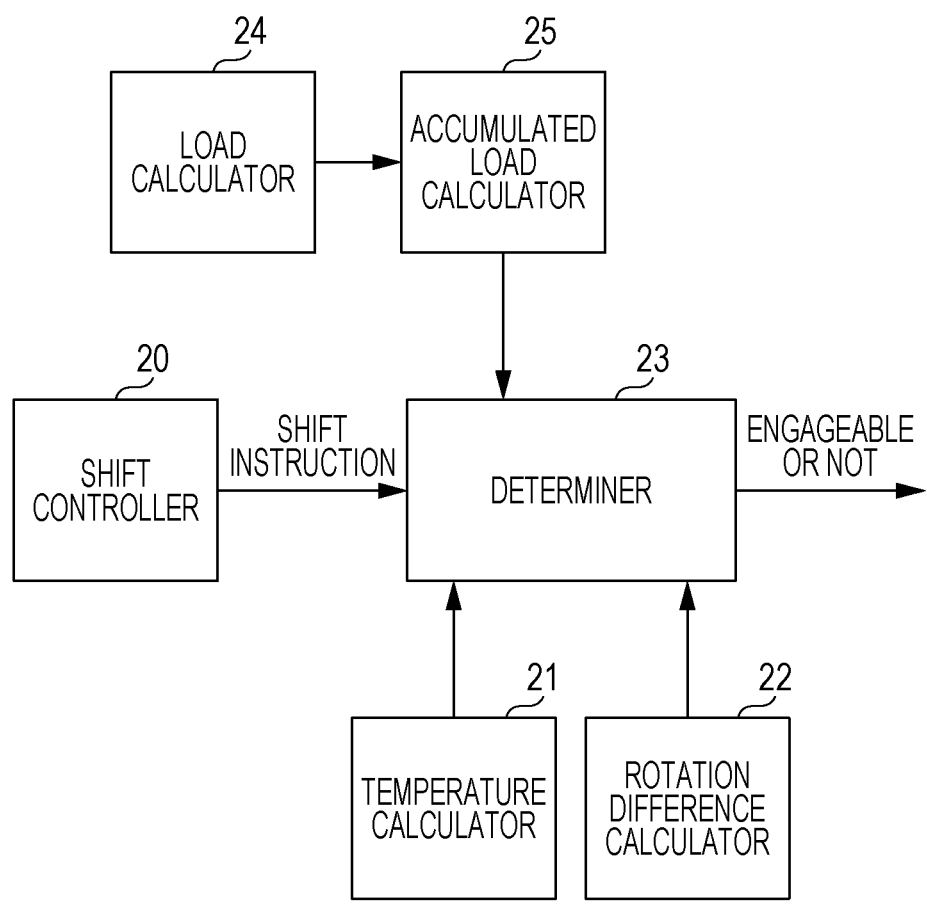
FIG. 2 is a block diagram illustrating a functional configuration of the control device for the automatic transmission of the embodiment of the present application.

FIG. 2 is a block diagram illustrating a functional configuration of the control device for the automatic transmission of the present application. The functions illustrated in FIG. 2 are specifically executed by the electronic control unit 10.

A shift controller 20 determines an optimum gear position in accordance with the operating state of the vehicle, and generates a shift instruction for instructing a gear shift to the determined gear position. The shift controller 20 may employ any configuration that is known in the field of automatic shifting control of vehicles.

A temperature calculator 21 performs an operation for calculating the temperature of at least one of frictional engaging elements (specifically clutch plates) concerning shifting.

As a specific method for calculating the temperature, a known technique described in Japanese Patent No. 4913535 may be employed, for example.

A rotational difference calculator 22 performs an operation for calculating a rotational difference between the input and output of at least one of the frictional engaging elements (clutches) concerning shifting. As a specific method for calculating the rotational difference, a known technique described in Japanese Patent No. 4913535 may be employed, for example.

A determiner 23 determines whether a frictional engaging element instructed with a shift instruction generated by the shift controller 20 is engageable or not, on the basis of the calculated temperature of the frictional engaging element (i.e., the clutch), the calculated rotational difference, and a pattern of the shift instruction. The pattern of the shift instruction herein is a shifting mode to be currently performed, e.g., upshift, downshift, downshift skipping one or more positions, or sequential downshift in two or more positions. If the determiner 23 determines that the frictional engaging element is non-engageable upon generation of the shift instruction by the shift controller 20, a clutch engagement control signal for shifting is not issued to the hydraulic pressure control device 6, and clutch engagement is not performed (i.e., engagement is suspended). In this manner, it is possible to prevent seizing of the clutch facing due to heat generation caused by engagement. When the clutch is cooled with the suspension of engagement, the temperature calculated by the temperature calculator 21 in real time or the rotational difference calculated by the rotational difference calculator 22 in real time decreases. Thus, the determiner 23 determines that the frictional engaging element is engageable, and a clutch engagement control signal for shifting is issued to the hydraulic pressure control device 6, thereby performing clutch engagement for shifting. In this manner, engagement operation of the clutch can be appropriately delayed.

Figure 3A:
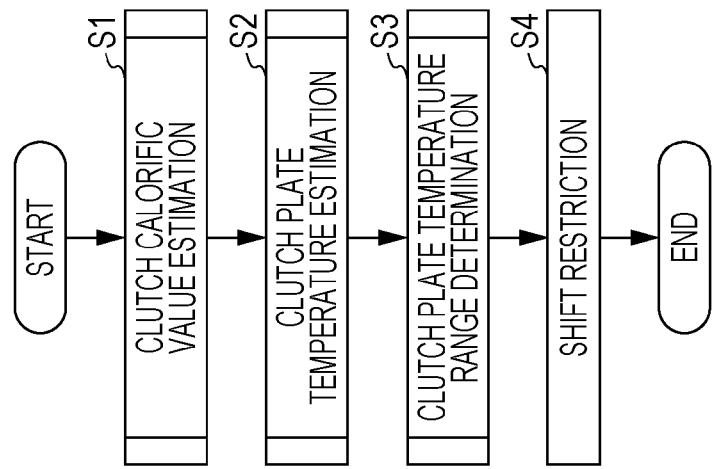
FIGS. 3A to 3C are flowcharts showing an example in which the functions of the control device for the automatic transmission of the embodiment of the present application are obtained by a computer program.
Figure 3B:
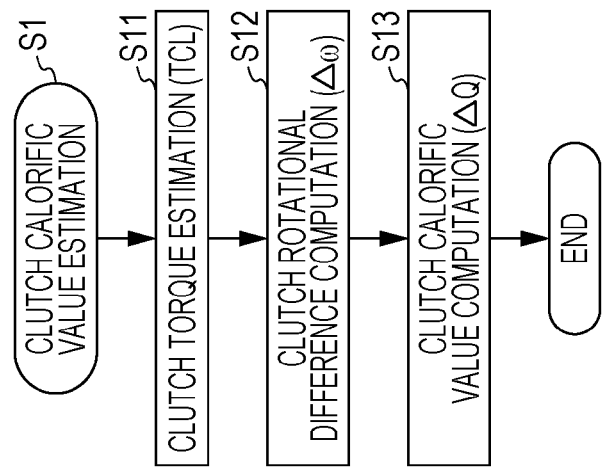
Figure 3C:
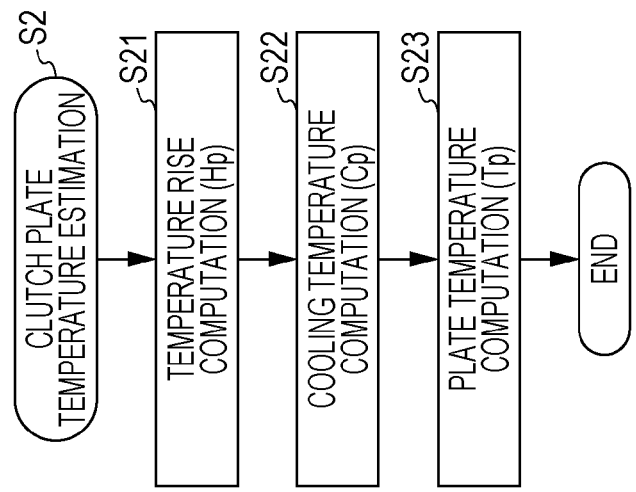

FIGS. 3A to 3C are flowcharts showing an example in which the functions of the shift controller, the calculator 21, the rotational difference calculator 22, and the determiner 23 are obtained by a computer program included in the electronic control unit 10. A "clutch calorific value estimation" routine at step S1 and a "clutch plate temperature estimation" routine at step S2 in FIG. 3A correspond to the function of the temperature calculator 21. The "clutch calorific value estimation" routine at step S1 is specifically shown in FIG. 3B. The "clutch plate temperature estimation" routine at step S2 is specifically shown in FIG. 3C. A "clutch rotational difference computation" at step S12 in FIG. 3B corresponds to the function of the rotational difference calculator 22. These functions are known functions, and will be briefly explained in the following description. A "clutch plate, temperature range determination" routine at step S3 and a "shift restriction" routine at step S4 in FIG. 3A correspond to the functions of the determiner 23. The process routines shown in FIGS. 3A to 3C are repeatedly performed by a timer interrupt, and processing such as temperature calculation, rotational difference calculation, and determination is performed in real time.

In FIG. 3A, in the "clutch calorific value estimation" routine at step S1, an operation of estimating the calorific value generated by each clutch concerning shifting, i.e., a clutch (an ON clutch) to be newly engaged and a clutch (an OFF clutch) to be disengaged, is performed in real time.

Specifically, as shown in FIG. 3B, in the "clutch calorific value estimation" routine, first, an operation of estimating a clutch torque TCL of a target clutch is performed at "clutch torque estimation" step S11. For example, on the basis of a clutch engagement instruction gauge pressure and other necessary parameters, an oil filler factor of the clutch is computed. On the basis of the obtained oil filler factor, a clutch torque TCL is calculated.

Next, in "clutch rotational difference computation" step S12, an input/output rotational difference $\Delta\omega$ of the clutch is calculated. This input/output rotational difference $\Delta\omega$ is calculated on the basis of the number of input revolutions Ni, the number of output revolutions No, and the gear ratio of the transmission.

Then, in "clutch calorific value computation" step S13, a clutch calorific value $\Delta Q$ of the clutch in a unit time is calculated as a product of the clutch torque TCL and the rotational difference $\Delta\omega$ (i.e., $\Delta Q = TCL \cdot \Delta\omega$), for example. The unit time herein corresponds to an interrupt cycle of repetitive processing routines shown in FIGS. 3A to 3C by a timer interrupt.

In FIG. 3A, in the "clutch plate temperature estimation" routine at step S2, an operation of estimating the clutch plate temperature of each clutch is performed. In this step, the current clutch plate temperatures of all the clutches are estimated, and managed. Specifically, in a case where a temperature rise due to heat generation occurs in an engaged clutch but a temperature decrease due to cooling after disengagement proceeds in every clutch in real time so that the disengaged clutch is the next target for engagement by shifting, the current clutch plate temperatures of all the clutches need to be estimated and managed in order to calculate the current clutch plate temperatures of all the clutches promptly.

As shown in FIG. 3C, in the "clutch plate temperature estimation" routine, first, at "temperature rise computation" step S21, the temperature rise Hp of a target clutch is calculated on the basis of the clutch calorific value $\Delta Q$. The temperature rise Hp refers to the degree of a temperature rise that is estimated as a temperature rise in one timer interrupt cycle in the processing routine that is repeatedly performed in FIGS. 3A to 3C. The temperature rises Hp of clutches not concerning the current shifting may be assumed to be substantially zero.

In "cooling temperature computation" step S22, the cooling temperature Cp of each clutch is calculated. The cooling temperature Cp herein refers to the degree of a temperature decrease that is estimated as a temperature decrease in one timer interrupt cycle. For example, the cooling temperature Cp is calculated by using, as parameters, the amount and temperature of lubricating oil of the clutch, which cause the temperature decrease.

In "plate temperature computation" step S23, a current clutch plate temperature Tp of each clutch is calculated. The current clutch plate temperature Tp is obtained by adding or reducing the temperature rise Hp and the cooling temperature Cp to or from a clutch plate temperature Tp_prev that was obtained in the previous operation for the clutch. That is, the current clutch plate temperature Tp is obtained by:

$$Tp = Tp\_prey + Tp + Cp$$

where the sign of Cp is negative.

In FIG. 3A, in the "clutch plate temperature range determination" routine at step S3, it is determined which one of temperature ranges the current clutch plate temperature Tp of each clutch belongs to. For example, as shown in FIG. 4, which will be described later, two temperature ranges are used as clutch plate temperature ranges. Specifically, a first temperature range (an allowed range) is a range where the plate temperature Tp is less than a threshold temperature Tth, and a second temperature range (an inhibited range) is a range where the plate temperature Tp is greater than or equal to the threshold temperature Tth.

In the "shift restriction" routine at step S4, referring to a predetermined shift restriction rule (table) for defining the engageablility of a clutch, it is determined whether engagement is allowed or not in a temperature range to which the current clutch plate temperature Tp of the clutch belongs.

The shift restriction rule (table) is used for defining the criterion for determining whether clutch engagement is allowed or not depending on a combination of a pattern of a shift instruction and a rotational difference in each of the temperature ranges determined as described above, as shown in FIG. 4. In FIG. 4, ○ (circle) indicates engageable, x (cross) indicates non-engageable, and Δ (triangle) indicates non-engageable if the rotational difference is larger than a predetermined threshold value or partially engageable under specific conditions. The symbol (#1) added to Δ (triangle) indicates that the mode of engagement control when the rotational difference is larger than the predetermined threshold value varies depending on the pattern of the shift instruction.

For example, in a case where the pattern of the shift instruction is "upshift," it is determined which temperature range the current clutch plate temperature Tp of a clutch for obtaining a gear position (a target position) after shifting belongs to. This is because the clutch (i.e., the clutch to be engaged) after shifting (to the target position) generates a larger amount of heat in the case of upshift. As shown in the column of "upshift" in FIG. 4, if the current clutch plate temperature Tp of the clutch belongs to the first temperature range (the allowed range), engagement of the clutch is allowed. On the other hand, if the current clutch plate temperature Tp belongs to the second temperature range (the inhibited range), engagement of the clutch is not allowed.

A case where the pattern of the shift instruction is "downshift" will be now described. In the case of "downshift," it is determined which temperature range the current clutch plate temperature Tp of a clutch (a clutch to be disengaged) that has attained a gear position before shifting belongs to. This is because the clutch (i.e., the clutch to be disengaged) before shifting (at the current gear position) generates a larger amount of heat in the case of downshift.

Figure 5A:
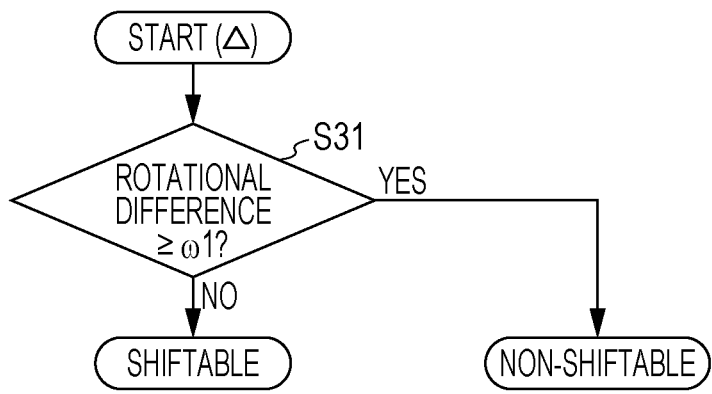
FIGS. 5A and 5B are flowcharts showing processes of engageability determination and control in accordance with a specific shift restriction rule.

As shown in the column of "one-stage downshift" in FIG. 4, in a case where the pattern of the shift instruction is "one-stage downshift," if the current clutch plate temperature Tp of a clutch belongs to the first temperature range (the allowed range), it is determined that the clutch is engageable (indicated as ○), and disengagement of the clutch and engagement of the clutch after shifting (to a target gear position) are allowed. On the other hand, if the current clutch plate temperature Tp belongs to the second temperature range (the inhibited range), engageability is determined in consideration of the rotational difference Δω of the clutch (indicated as Δ). FIG. 5A schematically shows a flowchart for determining engageability concerning "Δ." Specifically, if the current clutch plate temperature Tp belongs to the second temperature range (the inhibited range) and the rotational difference Δω of the clutch is greater than or equal to a predetermined threshold value ω1, it is determined that the gear position is non-shiftable (YES in step S31). On the other hand, if the rotational difference Δω of the clutch is less than the predetermined threshold value ω1 although the current clutch plate temperature Tp belongs to the second temperature range (the inhibited range), it is determined that the gear position is shiftable (NO in step S31). In this case, if it is determined that the gear position is non-shiftable, engagement of a clutch (at the current gear position) before shifting (i.e., a clutch to be disengaged) is maintained. Then, when the rotational difference Δω of the clutch decreases below the predetermined threshold value Δω or below the first temperature range (the allowed range), it is determined that the gear position is shiftable, and downshift in accordance with the shift instruction is executed. In this manner, in a range in which the shift restriction is received, shifting (engagement of the clutch) is delayed until it is determined that the gear position is shiftable.

As shown in the column of "downshift" and "multi-stage direct shift" in FIG. 4, in a case where the pattern of the shift instruction is "multi-stage direct shift (i.e., so-called skip downshift)," if the current clutch plate temperature Tp of the clutch (at the current gear position) before shifting (i.e., the clutch to be disengaged) belongs to the second temperature range (the inhibited range), it is determined that the clutch is non-engageable (indicated as x). On the other hand, if the current clutch plate temperature Tp belongs to the first temperature range (the allowed range), engageability determination and control are performed in consideration of the rotational difference Δω of the clutch (indicated as Δ#1).

Figure 5B:
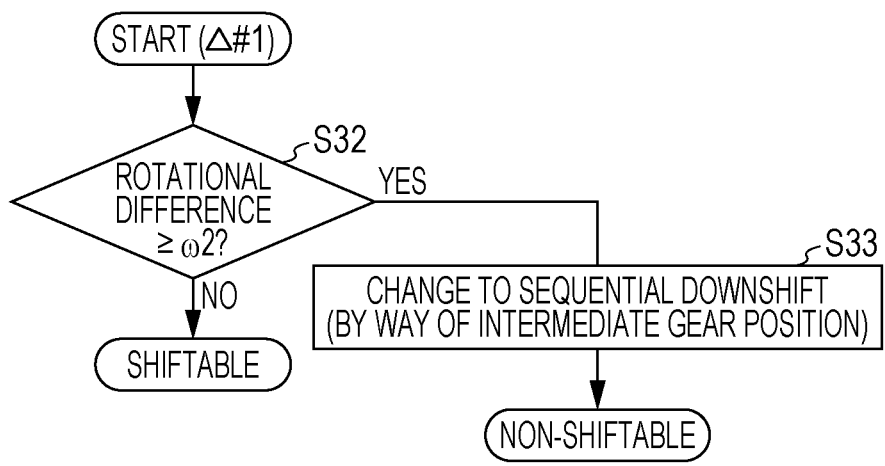

In this conditional shift restriction (Δ#1), non-engageability is not simply determined if the rotational difference Δω of the clutch is greater than or equal to the predetermined threshold value in the first temperature range (the allowed range). Instead, direct shift from the previous stage (e.g., the sixth gear position) to a subsequent stage (e.g., the fourth gear position) with a step of one or more stages is not allowed, the shift instruction is changed to step-by-step sequential downshift by way of the intermediate gear position (e.g., the fifth gear position), then engagement is allowed, and engagement is performed. FIG. 5B is a schematic flowchart for engageability determination and control in the case of "Δ(#1)." Specifically, if the rotational difference Δω of the clutch is greater than or equal to the predetermined threshold value ω2, the shift instruction is changed to step-by-step sequential downshift by way of the intermediate gear position, and then it is determined that the gear position is shiftable (processing from YES at step S32 to step S33). Thereafter, disengagement of the clutch at the intermediate gear position (e.g., the fifth gear position) is instructed, the subsequent stage (e.g., the fourth gear position) is indicated as a target position of downshift, and a clutch at the subsequent stage (e.g., the fourth gear position) is engaged. In this manner, the instruction is switched to step-by-step sequential downshift, and downshift is performed. This change not to the direct shift with a step of one or more stages but to the step-by-step sequential downshift places a workload of the clutch at the previous gear position on the clutch at the intermediate gear position. Thus, the workload of the clutch at the previous gear position can be reduced, and the calorific value decreases accordingly. In this manner the clutch at the previous gear position is protected against burning. In the conditional shift restriction (Δ#1), even if the temperature of the clutch belongs to the first temperature range (the allowed range), it is determined that the gear position is shiftable (NO at step S32) as long as the rotational difference Δω of the clutch is less than the predetermined threshold value.

As described above, in the control of this embodiment, in order to prevent thermal damage such as seizing of a clutch, protection control that inhibits engagement of the clutch in principle is performed when the temperature (the plate temperature) Tp of the clutch becomes greater than or equal to the threshold temperature Tth.

In the control of this embodiment, a cumulative load (i.e., a clutch load K, which will be described later) input to the clutch is calculated, and depending on the accumulated load, the threshold temperature Tth of the plate temperature Tp for performing (starting) protection control of the clutch is changed. That is, the threshold temperature Tth, which is a fixed value in a typical control device, is a variable value depending on the status of use of the clutch. Specifically, as shown in FIG. 2, the control device for the automatic transmission of the present application includes, as its functional configuration, a load calculator 24 that calculates a load input to a clutch in each shift operation and a cumulative load calculator 25 that calculates a cumulative load that is accumulated values calculated by the load calculator. On the basis of the cumulative load calculated by the cumulative load calculator 25, the determiner 23 changes the temperature threshold value Tth for determining whether the clutch is engageable or not. A process of changing the threshold temperature Tth will now be specifically described.

Figure 6:
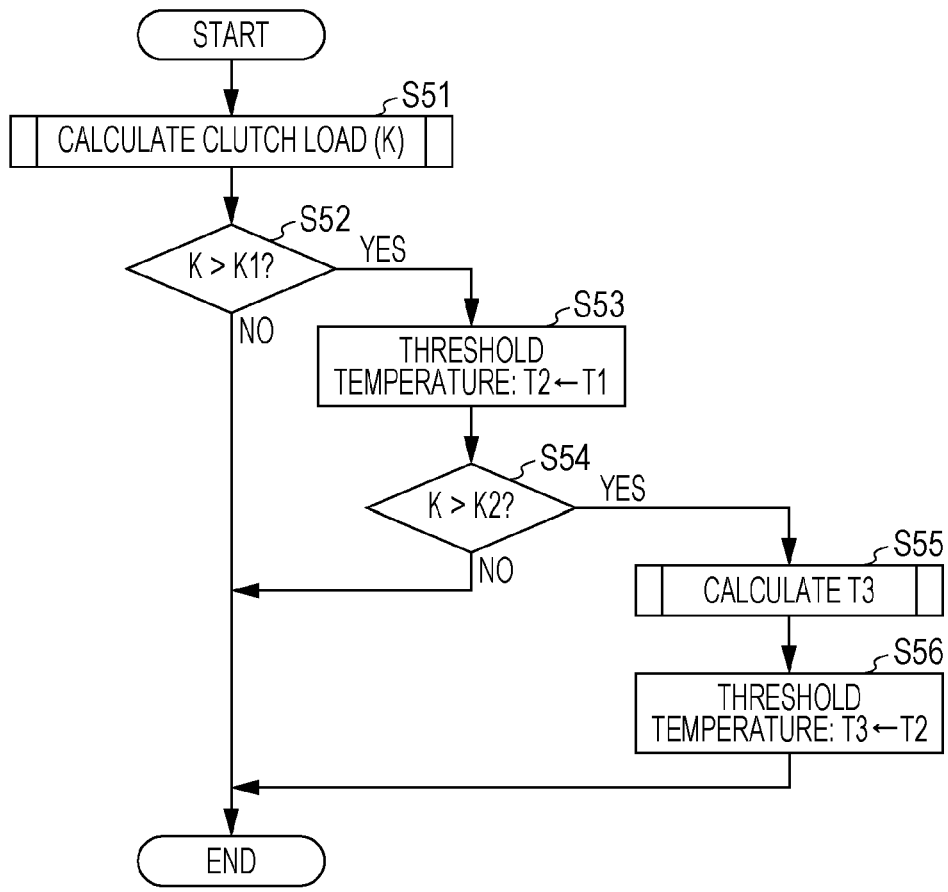
FIG. 6 is a flowchart for describing a process of changing a threshold value of a plate temperature of a clutch for use in shift restriction.
Figure 7:
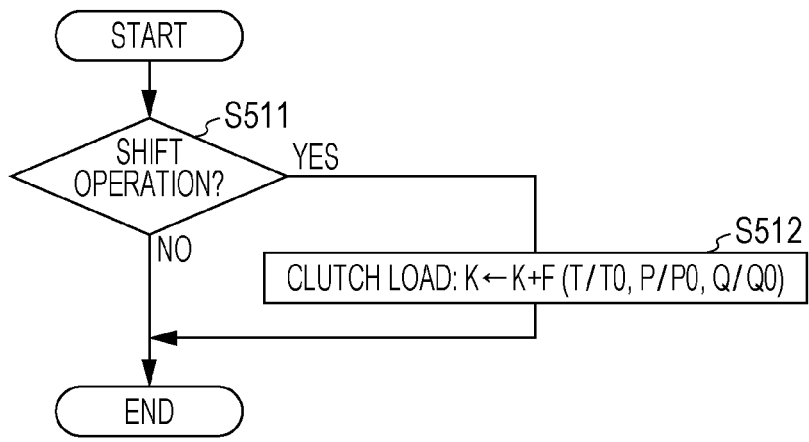
FIG. 7 is a flowchart showing a calculation process of a clutch load.

FIG. 6 is a flowchart for describing the process of changing the threshold temperature Tth of the plate temperature Tp of a clutch in the above-described shift restriction. First, accumulated loads (hereinafter referred to as a "clutch load K") input to the clutch by engagement of the clutch in shift operation is calculated (step S51). The clutch load K is calculated in accordance with a flowchart (subroutine shown in FIG. 7). Specifically, first, it is determined whether shift operation is being performed by the automatic transmission or not (step S511). If the shift operation is not being performed (NO), the process is finished without any additional process. On the other hand, if the shift operation is being performed (YES), the clutch load K is calculated (step S512).

The clutch load K is expressed in the following Equation 1:

$$K=\Sigma F(T,P,Q,N)/F(T0,P0,Q0,N0) \quad \text{(Equation 1)}$$

where (T, T0) is a plate temperature (Tp) of a clutch, (P, P0) is a clutch pressure, (Q, Q0) is a calorific value of the clutch in the shift operation, and (N, N0) is the number of operations (i.e., the number of engagements) of the clutch. In addition, each of T0, P0, and Q0 is an initial value in a situation where the clutch does not deteriorate. That is, the cumulative load (the degree of damage) input to the clutch is calculated on the basis of the temperature, the number of shift operations, and the calorific value of the clutch. As the clutch load K, accumulated loads input to each of clutches are individually calculated. In Equation 1, F(T, P, Q, N) are functions of T, P, Q, and N.

In this example, a stage ($0<K\leq K0$) before the calculated clutch load K reaches a predetermined first value K1 is an initial stage for protection control of the clutch, a stage ($K1<K\leq K2$) from when the calculated clutch load K exceeds the first value K1 to when the calculated clutch load K reaches a predetermined second value K2 ($K1<K2$) is a first stage for the protection control of the clutch, and a stage ($K2<K\leq K3$) from when the calculated clutch load K exceeds the second value K2 to when the calculated clutch load K reaches a predetermined third value K3 ($K2<K3$) is a second stage for the protection control of the clutch.

In the initial stage ($0<K\leq K1$) for the clutch protection control, the threshold temperature Tth for determining shiftability (engageability of the clutch) is T1. In the first stage ($K1<K\leq K2$), the threshold temperature Tth for determining shiftability is T2. In the second stage ($K2<K\leq K3$), the threshold temperature Tth for determining shiftability is T3. In this example, T1 and T2 are predetermined temperatures (constant values), and T3 is a temperature calculated depending on situations of the first stage and the second stage. A calculation method of T3 will be described later. The threshold temperature T1 may be set at 290° C., and the threshold temperature T2 may be set at 275° C., for example.

Specifically, as shown in the flowchart of FIG. 6, the clutch load K is calculated at step ST51, and then, it is determined whether the calculated clutch load K is larger than K1 or not. If the clutch load K is less than or equal to K1 (NO), the threshold temperature Tth is kept at T1, and the process is finished. On the other hand, if the clutch load K is larger than K1 (K>K1) (YES), the threshold temperature Tth for the protection control of the clutch is changed from T1 to T2 (switching). Subsequently, it is determined whether the clutch load K is larger than K2 or not (step S54). Then, if the clutch load K is less than or equal to K2 (NO), the threshold temperature Tth is kept at T2, and the process is finished. On the other hand, if the clutch load K is larger than K2 (K>K2) (YES), the threshold temperature T3 for the clutch protection control to be used in the second stage is calculated (step S55).

Figure 8:
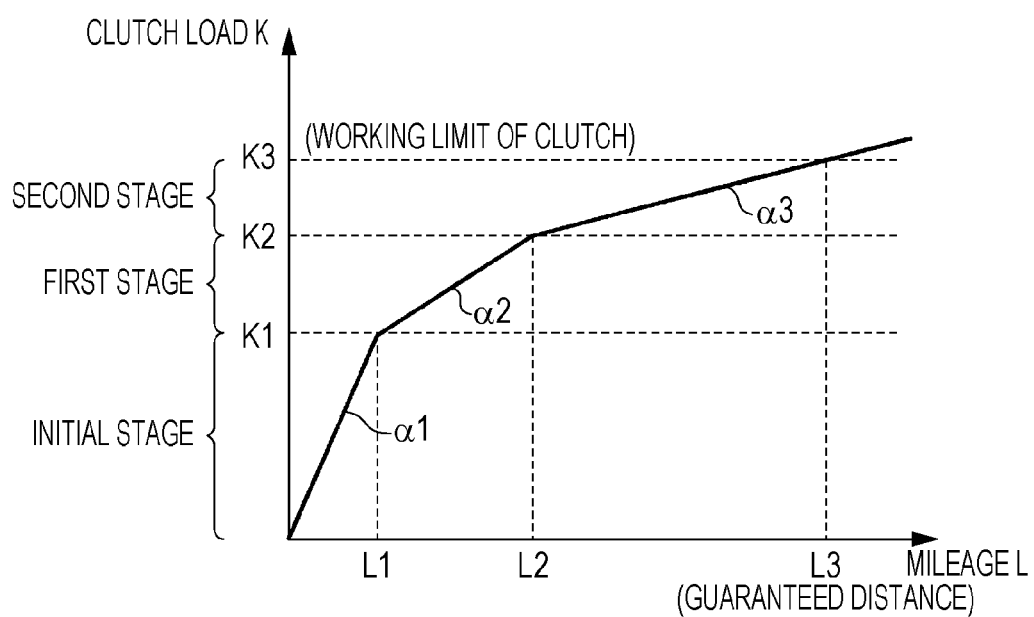
FIG. 8 is a graph showing a relationship between a mileage of a vehicle and a clutch load.

A process of calculating the threshold temperature T3 will now be described. FIG. 8 is a graph showing a relationship between a mileage (a cumulative mileage) L of a vehicle and a clutch load K. As shown in the graph, a mileage L of the vehicle is L1 when the clutch load K is K1, and the mileage L of the vehicle is L2 when the clutch load K is K2. A guaranteed distance (a mileage at which the clutch reaches the working limit) L of the clutch is L3, and the clutch load K corresponding to the guaranteed distance L3 is K3. In the initial stage ($0<K\leq K1$) of the clutch protection control, an amount of change α1 of clutch load K=K1 with respect to the mileage L=L1 of the vehicle is expressed by the following Equation 2:

$$\alpha1=K1/L1 \quad \text{(Equation 2)}$$

In the first stage ($K1<K\leq K2$) of the clutch protection control, an amount of change α2 of a clutch load K=K2−K1 with respect to a mileage L=L2−L1 of the vehicle is expressed by the following Equation 3:

$$\alpha2=(K2-K1)/(L2-L1) \quad \text{(Equation 3)}$$

In the second stage ($K2<K\leq K3$) of the clutch protection control, an amount of change α3 of a clutch load K=K3−K2 with respect to a mileage L=L3−L2 of the vehicle is expressed by the following Equation 4:

$$\alpha3=(K3-K2)/(L3-L2) \quad \text{(Equation 4)}$$

Thus, the threshold temperature T3 to be used in the second stage of the clutch protection control is calculated from the following Equation 5:

$$T3=T2-\{\alpha3/(\alpha1-\alpha2)\}\cdot(T1-T2) \quad \text{(Equation 5)}$$

In this manner, the threshold temperature T3 can be calculated on the basis of the clutch load K3 at the operation limit of the clutch, the mileage (the cumulative mileage) L3 of the vehicle at the operation limit of the clutch, and the amounts of change α1 to α3 of the clutch load K with respect to an actual mileage L of the vehicle. In a case where T1=290° C. and T2=275° C., the calculated threshold temperature T3 is a temperature T3 of about 250° C., for example.

Referring back to the flowchart of FIG. 6, after the threshold temperature T3 has been calculated at step ST55, the threshold temperature Tth for protection control of the clutch is switched from T2 to T3.

Figure 9A:
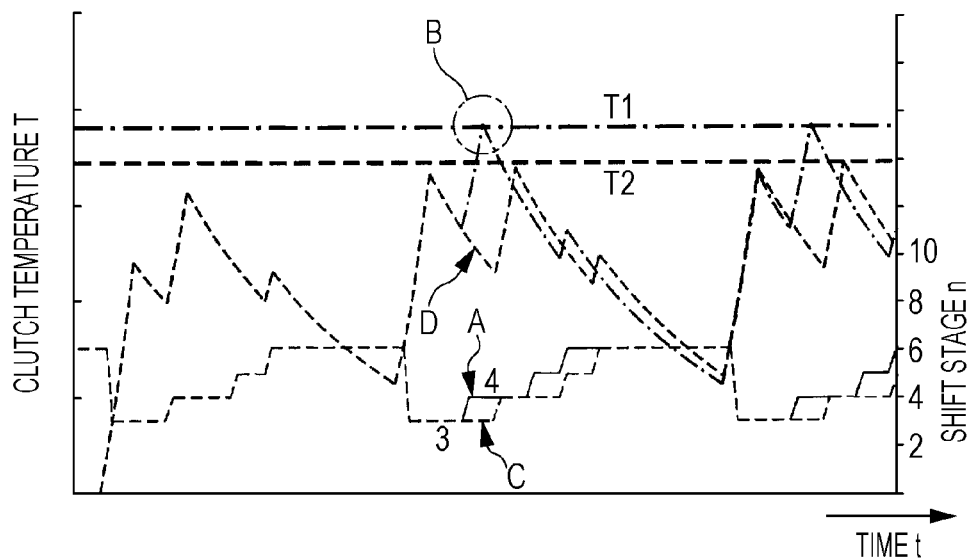
FIGS. 9A and 9B are graphs showing changes with time of a plate temperature and a gear position of a clutch in shift control.
Figure 9B:
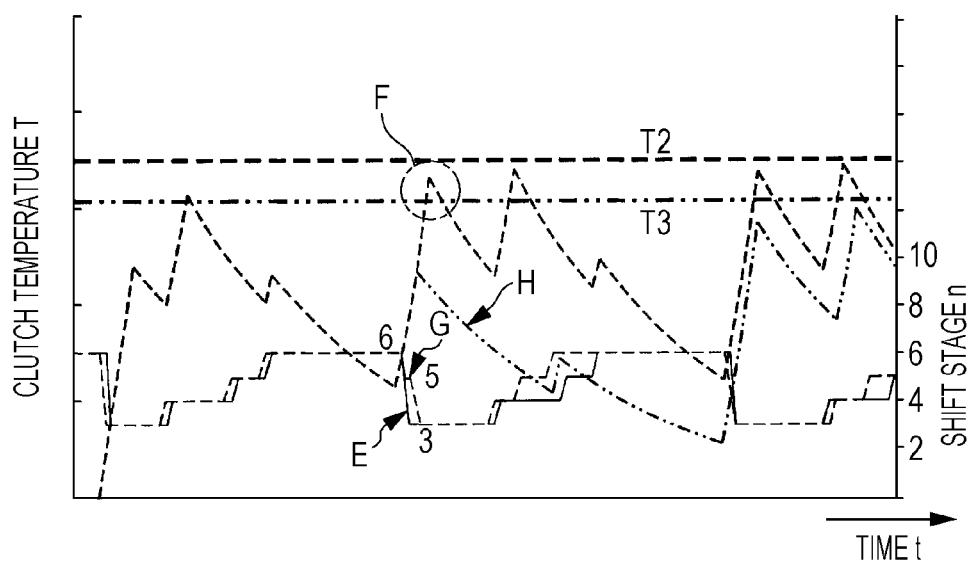

A shift control performed on the basis of the switched threshold temperature Tth will now be described. FIGS. 9A and 9B are graphs showing changes with time in plate temperature Tp and gear position n of the clutch in shift control. FIG. 9A shows a case where the threshold temperature Tth for shift restriction is changed from a temperature T1 to a temperature T2. FIG. 9B shows a case where the threshold temperature Tth for shift restriction is changed from the temperature T2 to a temperature T3. In the graph of FIG. 9A, the chain lines indicate the threshold temperature T1 and a change in plate temperature Tp corresponding to the threshold temperature T1, and dotted lines indicate the threshold temperature T2 and a change in plate temperature Tp corresponding to the threshold temperature T2. The gear positions indicated by the dotted lines show switching of gear positions corresponding to the threshold temperature T1, and changes in gear position indicated by the continuous lines show switching of gear positions corresponding to the threshold temperature T2. Similarly, in the graph of FIG. 9B, the dotted lines show the threshold temperature T2 and a change in plate temperature Tp corresponding to the threshold temperature T2, and the long dashed double-short dashed lines show the threshold temperature T3 and a change in plate temperature Tp corresponding to the threshold temperature T3. The gear positions indicated by the dotted lines show switching of gear positions corresponding to the threshold temperature T2, and a change in gear position indicated by the continuous lines shows switching of gear positions corresponding to the threshold temperature T3.

In the example of FIG. 9A, in the case of changing the threshold temperature Tth for the shift control from T1 to T2, in a normal shift control (switching of gear position indicated by dotted lines), switching (upshift) of the gear position from the third gear position to the fourth gear position stage indicated by A in FIG. 9A might cause the plate temperature Tp to exceed the threshold temperature T2 temporarily (indicated by B). In a case where the threshold temperature T is expected to exceed T2 as described above, switching of the gear position at this timing is not allowed (indicated by C), and switching of the gear position is delayed until it is determined that the threshold temperature does not exceed T2 (shift hold control). In this manner, the plate temperature Tp is controlled within a range in which the plate temperature Tp does not exceed the threshold temperature T2 (indicated by D).

Similarly, in the example of FIG. 9B, in the case of changing the threshold temperature Tth for the shift control from T2 to T3, in a normal shift control (switching of the gear position indicated by dotted lines), skip shifting (skip downshift) from the sixth gear position to the third gear position indicated b E in FIG. 9B might cause the plate temperature Tp to exceed the threshold temperature T3 temporarily (indicated by F). In this manner, in a case where the plate temperature Tp is expected to exceed the threshold temperature T3, skip shifting at this time is not allowed (indicated by G), and sequential switching of the gear position is performed. In this manner, the plate temperature Tp is controlled within a range in which the plate temperature Tp does not exceed the threshold temperature T3 (indicated by H).

As described above, in protection control of a clutch by the control device of this embodiment, when a shift instruction of the automatic transmission is issued, a calculated plate temperature Tp of the clutch and the threshold temperature Tth previously determined on the basis of a rotational difference of the clutch and a pattern of the shift instruction are compared with each other, thereby determining engageability of the clutch. If the clutch is determined to be non-engageable, engagement of the clutch (shift operation) is delayed until the clutch is determined to be engageable. In such a control, a cumulative load (a clutch load K) input to each clutch when shift operation by the automatic transmission is performed is calculated. When the calculated clutch load K becomes greater than or equal to a predetermined value, the threshold temperature Tth for determining engageability of the clutches changed.

In this manner, the temperature range for protection control of the clutch can be changed step by step depending on the cumulative load. Thus, protection control can be appropriately performed depending on actual application of clutches. As a result, performance of the clutches can be maintained in a guarantee period of the automatic transmission.

Specifically, in typical protection control of clutches, a threshold temperature for determining engageability of the clutch is determined only in order to prevent damage by, for example, seizing on the clutches. In this typical control, the threshold temperature is constant (at a fixed value) during the entire service period of the clutch. On the other hand, in clutch protection control of this embodiment, the threshold temperature, which is constant in typical control, is variable depending on a value (i.e., a clutch load K) calculated depending on actual application of a clutch.

Specifically, if the threshold temperature Tth in clutch protection control is set at a lower temperature, a smaller load is applied to the clutch. However, shift restriction in shift control increases, and this increase might adversely affect running performance of a vehicle. Thus, setting the threshold temperature Tth at a low temperature during the entire service period of the clutch is not advantageous in view of obtaining excellent running performance of the vehicle. On the other hand, the threshold temperature Tth needs to be set at a lower temperature after long-term use of clutches in order to obtain durability of the clutches. In view of this, in the control of this embodiment, the threshold temperature Tth for protection control is varied depending on the period of use and the cumulative load of clutches. In this manner, both excellent running performance of the vehicle in an initial stage of use of the clutches and durability after long-term use of the clutches can be achieved.

In addition, in the protection control of this embodiment, the threshold temperature Tth is set at a lower temperature as the cumulative load K increases. That is, it is determined that a clutch deteriorates as the cumulative load K of the clutch increases. Thus, in such a case, the threshold temperature Tth for protection control of the clutch is set at a lower temperature. In this manner, the threshold temperature is optimized in consideration of durability of the vehicle in long-term use of the clutches. This ensures protection of the clutches, thereby maintaining performance of the clutches in a guarantee period of the automatic transmission.

Further, in the control device of this embodiment, in calculating the threshold temperature T3 to be used in the second stage of clutch protection control, the threshold temperature T3 is calculated (determined) on the basis of the total load (cumulative load) (K3), which is an operation limit of a clutch, the mileage (L3) of the vehicle with which performance of the clutches is guaranteed, and the amount of change in cumulative load calculated on the basis of the clutch cumulative load (K) of the clutches and the mileage (L) of the vehicle.

With this configuration, the threshold temperature can be set at an appropriate value depending on actual application of the clutches. Thus, performance of the clutches in the guarantee period of the automatic transmission can be maintained.

The foregoing description has been made on an embodiment of the present application. However, the present application is not limited to the foregoing embodiment, and various changes or modifications may be made within the scope of the appended claims, description, and drawings.

In an aspect of the present application, a control device for an automatic transmission selectively engages a plurality of frictional engaging elements for shift control, and includes: a shift instruction section that issues a shift instruction; a temperature calculator that calculates a temperature of at least one of the frictional engaging elements; an engageability determiner that determines whether the at least one of the frictional engaging elements is engageable or not on the basis of a comparison between the temperature (Tp) of the at least one of the frictional engaging elements calculated by the temperature calculator and a predetermined threshold temperature (Tth) when the shift instruction section issues the shift instruction; an engagement delay section that delays, if the engageability determiner determines that the one of the frictional engaging elements is non-engageable, engagement of the at least one of the frictional engaging elements until the at least one of the frictional engaging elements is determined to be engageable; and a cumulative load calculator that calculates a cumulative load (K) of accumulated loads input to each of the frictional engaging elements when the automatic transmission performs shift operation, and the engageability determiner changes a threshold temperature (Tth) for determining whether the at least one of the frictional engaging elements is engageable or not when the cumulative load (K) calculated by the cumulative load calculator reaches a value greater than or equal to a predetermined value (K1, K2, K3).

In the control device for the automatic transmission that performs protection control of inhibiting engagement of at least one of the frictional engaging elements when the at least one of the frictional engaging elements reaches a temperature greater than or equal to the threshold temperature, the cumulative load input to the frictional engaging element is calculated, and depending on the cumulative load, the threshold temperature for performing (starting) protection control of the frictional engaging element is changed. That is, the range of protection control for the frictional engaging element can be changed step by step in accordance with the cumulative load. In this manner, protection control appropriate for application of the frictional engaging elements can be performed, and thus performance of the frictional engaging elements can be maintained in a guarantee period of the automatic transmission.

In the control device, the threshold temperature (Tth) is preferably set at a lower temperature as the cumulative load (K) calculated by the cumulative load calculator increases. That is, it is determined that the frictional engaging elements deteriorate as the cumulative loads of the frictional engaging elements increase. Thus, in this case, the threshold temperature for protection control of the frictional engaging elements is set at a lower temperature. In this manner, the threshold temperature is optimized in consideration of durability of the frictional engaging elements and the vehicle in long-term use. This ensures protection of the frictional engaging elements and maintains performance of the frictional engaging elements in a guarantee period of the automatic transmission.

In the control device, the threshold temperature (Tth) may be calculated on the basis of a cumulative load (K3) at an operation limit of the at least one of the frictional engaging elements, a mileage (L3) of a vehicle at the operation limit of the at least one of the frictional engaging elements, and an amount of change (α1 to α3) in the cumulative load (K) with respect to an actual mileage (L) of the vehicle.

With this configuration, the threshold temperature appropriate for the operation limit and actual application of the frictional engaging elements can be selected. This configuration further ensures maintenance of performance of the frictional engaging elements in the guarantee period of the automatic transmission. The characters in the brackets described above are an example of components of an embodiment that will be described above as an example of the present application.

In the control device for the automatic transmission of the present application, the threshold temperature for protection control of frictional engaging elements is optimized in view of durability. Thus, the frictional engaging elements can be protected against thermal damage upon a temporary increase in temperature of the frictional engaging elements. In addition, performance of the frictional engaging elements in the guarantee period of the automatic transmission can be maintained.

Obviously, numerous modifications and variations of the present invention are possible in light of the above teachings. It is therefore to be understood that within the scope of the appended claims, the invention may be practiced otherwise than as specifically described herein.

What is claimed is:

1. A control apparatus for an automatic transmission that selectively engages a plurality of frictional engaging elements for shift control, the control apparatus comprising:
   a shift instruction section that issues a shift instruction;
   a temperature calculator that calculates a temperature of at least one of the frictional engaging elements;
   an engageability determiner that determines whether the at least one of the frictional engaging elements is engageable or not on the basis of a comparison between the temperature of the at least one of the frictional engaging elements calculated by the temperature calculator and a predetermined threshold temperature when the shift instruction section issues the shift instruction;
   an engagement delay section that, if the engageability determiner determines that the one of the frictional engaging elements is non-engageable, delays engagement of the at least one of the frictional engaging elements until the at least one of the frictional engaging elements is determined to be engageable;
   a load calculator that calculates a load input to each of the frictional engaging elements when the automatic transmission performs shift operation; and
   a cumulative load calculator that calculates a cumulative load of accumulated loads calculated by the load calculator, wherein
   the engageability determiner changes the threshold temperature for determining whether the at least one of the frictional engaging elements is engageable or not when the cumulative load calculated by the cumulative load calculator reaches a value greater than or equal to a predetermined value.

2. The control apparatus of claim 1, wherein
   the threshold temperature is set at a lower temperature as the cumulative load calculated by the cumulative load calculator increases.

3. The control apparatus of claim 1, wherein
   the threshold temperature is calculated on the basis of a cumulative load at an operation limit of the at least one of the frictional engaging elements, a mileage of a vehicle at the operation limit of the at least one of frictional engaging elements, and an amount of change of the cumulative load with respect to an actual mileage of the vehicle.

4. A control apparatus for an automatic transmission that selectively engages a plurality of frictional engaging elements for shift control, the control apparatus comprising:
   a shift instruction device configured to output a shift instruction;
   a temperature calculator configured to calculate a temperature of at least one of the plurality of frictional engaging elements;
   an engageability determiner configured to determine whether the at least one of the plurality of frictional engaging elements is engageable or not based on a comparison between the temperature of the at least one of the plurality of frictional engaging elements calculated by the temperature calculator and a predetermined threshold temperature in a case where the shift instruction device outputs the shift instruction;

an engagement delay device configured to delay engagement of the at least one of the plurality of frictional engaging elements until the at least one of the plurality of frictional engaging elements is determined to be engageable in a case where the engageability determiner determines that the at least one of the plurality of frictional engaging elements is non-engageable;

a load calculator configured to calculate a load input to each of the plurality of frictional engaging elements in a case where the automatic transmission performs shift operation;

a cumulative load calculator configured to calculate a cumulative load of the load calculated by the load calculator; and a threshold temperature changer configured to change the predetermined threshold temperature in a case where the cumulative load calculated by the cumulative load calculator reaches a value greater than or equal to a predetermined value.

5. The control apparatus of claim 4, wherein
the threshold temperature is set at a lower temperature as the cumulative load calculated by the cumulative load calculator increases.

6. The control apparatus of claim 4, wherein
the threshold temperature is calculated based on a cumulative load at an operation limit of the at least one of the plurality of frictional engaging elements, a mileage of a vehicle at the operation limit of the at least one of the plurality of frictional engaging elements, and an amount of change of the cumulative load with respect to an actual mileage of the vehicle.

7. A control apparatus for an automatic transmission that selectively engages a plurality of frictional engaging elements for shift control, the control apparatus comprising:
shift instruction means for outputting a shift instruction;
temperature calculating means for calculating a temperature of at least one of the plurality of frictional engaging elements;
engageability determining means for determining whether the at least one of the plurality of frictional engaging elements is engageable or not based on a comparison between the temperature of the at least one of the plurality of frictional engaging elements calculated by the temperature calculating means and a predetermined threshold temperature in a case where the shift instruction means outputs the shift instruction;
engagement delay means for delaying engagement of the at least one of the plurality of frictional engaging elements until the at least one of the plurality of frictional engaging elements is determined to be engageable in a case where the engageability determining means determines that the at least one of the plurality of frictional engaging elements is non-engageable;
load calculating means for calculating a load input to each of the plurality of frictional engaging elements in a case where the automatic transmission performs shift operation;
cumulative load calculating means for calculating a cumulative load of the load calculated by the load calculating means; and
threshold temperature changing means for changing the predetermined threshold temperature in a case where the cumulative load calculated by the cumulative load calculating means reaches a value greater than or equal to a predetermined value.

8. A control method for an automatic transmission that selectively engages a plurality of frictional engaging elements for shift control, the control method comprising:
outputting a shift instruction;
calculating a temperature of at least one of the plurality of frictional engaging elements;
determining whether the at least one of the plurality of frictional engaging elements is engageable or not based on a comparison between the temperature of the at least one of the plurality of frictional engaging elements calculated by the calculating of the temperature and a predetermined threshold temperature in a case where the shift instruction is output;
delaying engagement of the at least one of the plurality of frictional engaging elements until the at least one of the plurality of frictional engaging elements is determined to be engageable in a case where the at least one of the plurality of frictional engaging elements is determined to be non-engageable;
calculating a load input to each of the plurality of frictional engaging elements in a case where the automatic transmission performs shift operation;
calculating a cumulative load of the load calculated by the calculating of the load; and
changing the predetermined threshold temperature in a case where the cumulative load calculated by the calculating of the cumulative load reaches a value greater than or equal to a predetermined value.

* * * * *